United States Patent [19]

Nobuo et al.

[11] Patent Number: 4,710,331

[45] Date of Patent: Dec. 1, 1987

[54] PROCESS FOR THE PRODUCTION OF POLYTETRAFLUOROETHYLENE POROUS MEMBRANES

[75] Inventors: Kawahigashi Nobuo; Hashida Shigesou; Kojima Yasunobu, all of Kanagawa, Japan

[73] Assignee: Nippon Valqua Kogyo Kabushiki Kaisha, Tokyo, Japan

[21] Appl. No.: 863,994

[22] Filed: May 15, 1986

[30] Foreign Application Priority Data

Jun. 21, 1985 [JP] Japan ................... 60-135664

[51] Int. Cl.$^4$ ............ B29C 55/04; B29C 55/12; B29C 67/20
[52] U.S. Cl. .................... 264/41; 264/127; 264/158; 264/288.8
[58] Field of Search ............ 264/127, 158, 41, 288.8

[56] References Cited

U.S. PATENT DOCUMENTS

| | | | |
|---|---|---|---|
| 2,642,625 | 6/1953 | Peck | 264/127 |
| 2,781,552 | 2/1957 | Gray | 264/158 |
| 2,819,209 | 1/1958 | Pall et al. | 264/127 |
| 3,152,082 | 10/1964 | Davis et al. | 264/127 |
| 4,110,392 | 8/1978 | Yamazaki | 264/41 |

*Primary Examiner*—James Lowe
*Attorney, Agent, or Firm*—Wenderoth, Lind & Ponack

[57] ABSTRACT

A process for the production of PTFE porous membranes is provided wherein a PTFE preform is prepared by compression molding a PTFE molding powder of 1–90 μm obtained by suspension polymerization of tetrafluoroethylene, the preform is sintered at a temperature above 327° C., followed by skiving the heated preform into a film form. The thus-obtained film is heat treated at a temperature above 327° C., the heat treated film is slowly cooled at a cooling rate of less than 70° C./hr so as to adjust the crystallinity of PTFE in the sintered film to 60–75% and the film is stretched either uniaxially or biaxially to 1.3 to 6.5 times while heating at a temperature of 100°–320° C.

6 Claims, No Drawings

PROCESS FOR THE PRODUCTION OF POLYTETRAFLUOROETHYLENE POROUS MEMBRANES

TECHNICAL FIELD OF THE INVENTION

This invention relates to a process for the production of polytetrafluoroethylene porous membranes. More particularly, the invention is concerned with a process for the production of porous membranes which are produced from the starting molding powder of polytetrafluoroethylene obtained by suspension polymerization, which porous membranes are excellent in strength and have pores which are nearly round in shape and relatively uniform in size, and, moreover, which are also excellent in porosity.

TECHNICAL BACKGROUND OF THE INVENTION AND PROBLEMS ASSOCIATED THEREWITH

Because of their excellent chemical resistance, thermal resistance and mechanical properties, polytetrafluoroethylene resins (hereinafter abbreviated sometimes to PTFE) are used in various fields. For instance, porous membranes made of PTFE are widely used, utilizing such properties as referred to above, as filters for corrosive materials or high temperature substances, and also used as diaphragms for electrolytic baths, fuel cells, etc.

In recent years, moreover, with the developments in the semi-conductor industry and in molecular biology, porous membranes having pores which are of nearly round and uniform in pore diameter are in demand for the purpose of removing very minute impurities from gases or liquids. PTFE porous membranes as characterized above have come to attract keen interests of various fields of industry.

For the production of porous membranes from PTFE resins, there has heretofore been adopted a process in which PTFE finely divided particles, present as fine powders having an average particle diameter of 0.1–0.4 $\mu$m obtained by emulsion polymerization of tetrafluoroethylene, is incorporated into a liquid lubricant, and the mixture is compression molded to prepare it to a preform. The preform is then processed into a film form by an extruding or rolling technique or combination thereof, the liquid lubricant is removed therefrom, and the PTFE membrane obtained is monoaxially or biaxially stretched under the usual heating conditions. For instance, Japanese Patent Publication No. 42794/1978 discloses a process for the production of PTFE porous materials, wherein the sintered PTFE membrane is heat treated at a temperature above 327° C., followed by slow cooling, so that crystallinity of PTFE in the membrane becomes 80% or higher, and the membrane, thus treated, is stretched at a temperature of 25°–260° C. monoaxially at a draw ratio of 1.5–4 times.

However, the process referred to above involved difficulties in that because the starting material used is a PTFE fine powder, the PTFE membrane prepared therefrom is liable to be fibrillated at the time the membrane is stretched, and hence it is difficult to produce PTFE membranes having pores which are nearly in a round shape and a predetermined pore diameter. That is, the pores formed in the PTFE porous membranes obtained by this process were of a long elliptical form having a marked difference between the major axis and the minor axis thereof, and hence it was difficult to obtain pores nearly of a round shape even when the PTFE membranes were biaxially stretched. Furthermore, this process involved such problems that the mechanical strength of the porous membranes obtained thereby cannot be said to be sufficient.

We have conducted researched in an effort to solve the above-mentioned problems and have eventually accomplished the invention on the basis of the following facts. That is, it has been discovered that (a) in a process for production PTFE porous membrane, it is better to use a molding power of PTFE obtained by suspension polymerization of tetrafluoroethylene than the use of finely divided particles of PTFE known as the aforesaid fine powder obtained by emulsion polymerization of tetrafluoroethylene. A further discovery is that (b) in a process for stretching PTFE in a film form under heating conditions, by virtue of the addition thereto of such an operation that the PTFE in a film form is previously heated at a temperature above 327° C. and then slowly cooled at a cooling rate of less than 70° C./hr so as to adjust the crystallinity of PTFE to 60–75%, a PTFE porous membrane having greatly improved pore characteristics and mechanical strength as well as an excellent porosity can be obtained.

OBJECTS OF THE INVENTION

The present invention is intended to solve the problems as mentioned previously, and an object thereof is to provide a process for the production of PTFE porous membranes which have pores having nearly a round shape, the pore diameter of which can be controlled uniformly to a predetermined size. A further object of the invention is to provide a process for the production of PTFE porous membranes which are excellent in mechanical strength as well as in porosity.

An essential feature of the processes for the production of PTFE porous membranes in accordance with the invention resides in the following: A PTFE preform is prepared by the compression molding of a PTFE molding powder having an average particle diameter of 1–90 $\mu$m obtained by suspension polymerization of tetrafluoroethylene; the preform is heated at a temperature above 327° C. followed by skiving the heated preform into a film form; the obtained film is heat treated at a temperature above 327° C.; the heated film is slowly cooled at a cooling rate of less than 70° C./hr so as to adjust the crystallinity of PTFE in the heated film to 60–75%, and the film is stretched either monoaxially or biaxially to 1.3 to 6.5 times while heating at a temperature of 100°–320° C.

DETAILED DISCLOSURE OF THE INVENTION

The PTFE used in the production of PTFE porous membranes in accordance with the present invention is a PTFE molding powder having an average particle diameter of 1–900 $\mu$m, preferably 10–50 $\mu$m, obtained by suspension polymerization of tetrafluoroethylene.

The PTFE molding powder as referred to above is preformed in a metal mold or the like at a molding pressure of 10–30 MPa, whereupon a PTFE preform is obtained. Subsequently, this preform is sintered at a temperature of above 327° C., preferably 340°–380° C., and then slowly cooled to obtain a cylindrical molding ordinarily. This cylindrical molding is skived by means of a skiver into a PTFE film of about 0.05–0.2 mm in thickness. The PTFE film thus obtained is used as a preferable film in the process of the invention.

Though the PTFE film is obtained by skiving the heated PTFE preform, PTFE film obtained by procedures other than the skiving technique can also be used in the present invention. In short, PTFE film used in the invention may be any film, provided it is one obtained by the compression molding of PTFE molding powder of an average particle diameter of 1–900 μm obtained by suspension polymerization of tetrafluoroethylene, followed by heating.

The thus obtained PTFE film is heat treated again at a temperature above 327° C., preferably 350°–390° C., and the heat treated film is slowly cooled at a cooling rate of less than 70° C./hr so as to adjust the crystallinity of PTFE in the film to 60–75%. The cooling rate used in that case is desirably 10° C./hr or less, preferably about 5° C./hr. By virtue of subjecting the heat treated PTFE film to this slow cooling treatment, it becomes possible that a pore diameter of pores of PTFE porous membrane obtained later in the subsequent step can be controlled to a predetermined largeness, the pores obtained can be made nearly round in shape, and the porosity of the PTFE porous membrane obtained can be enhanced. Thus, the porous membrane obtained according to the present invention is excellent in mechanical strength. Furthermore, the PTFE film thus slowly cooled is excellent in stability when it is stretched, as evidenced by the fact that breakage or pinholing is less liable to occur at the time of streching said PTFE film.

Where PTFE in a molten state is cooled at a cooling rate greater than 70° C./hr, the crystallinity of PTFE becomes less than 55%. If the crystallinity of PTFE is less than 55%, the PTFE porous membrane obtained therefrom is only that which is more or less low in porosity, though it is possible to control the pore diameter of the pores of said membrane to a predetermined largeness and make the pores nearly round in shape.

The PTFE film is subjected at least once to such a slow cooling treatment in the process of the invention. That is, the PTFE film may be subjected twice or more to this slow cooling treatment.

Subsequently, the PTFE film thus slowly cooled is streched either uniaxially or biaxially to 1.3 to 6.5 times while heating at a temperature of 100°–320° C., preferably 200°–250° C. When the temperature of the PTFE film is less than 100° C. at the time of stretching thereof, the mechanical strength of the resulting PTFE porous membrane is undesirably found insufficient as breakage or the like sometimes occurs in the PTFE porous membrane being produced. The streching temperature of above 320° C., on the one hand, is not preferable since pores which are uniform in diameter are not formed in the PTFE porous membrane obtained thereby.

The draw ratio employed for stretching the PTFE film in that case is preferably 1.3 to 6.5 times, the use of a draw ratio exceeding 6.5 times is not preferable, since it is liable to cause pinholing in the film or breakage of the film at the time of streching thereof. The use of a draw ratio less than 1.3 times, on the one hand, is not preferable since no minute pores as desired are obtained in the resulting PTFE porous membrane.

In the case of subjecting the PTFE film to a slow cooling treatment, the draw ratio employed for streching the film can be raised higher than that used in the case of a PTFE film subjected to a quenching treatment and, moreover, pores uniform in pore diameter can be obtained in the PTFE porous membrane obtained from the slowly cooled PTFE film. This is considered ascribable to such facts that the PTFE film subjected to slow cooling treatment is higher in crystallinity than the PTFE film subjected to quenching treatment, the surface of the PTFE film during slow cooling treatment is liable to fibrillation and the fibrillated portions are widened preferably in the biaxial direction at the time of streching, thereby facilitating the control of the pore diameter of the pores formed thereby, and moreover making the pores nearly round in shape.

The stretching as referred to above is performed in the uniaxial or biaxial direction, preferably the biaxial direction. By virtue of subjecting the PTFE film to biaxial stretching, there is observed such effects that the pores of the PTFE porous membrane obtained thereby are found to be nearly round in shape.

PTFE porous membranes obtained in accordance with the present invention have a large number of continuous pores and are excellent in porosity, as evidenced by the fact that said porous membranes demonstrate large gas permeation amounts. The gas permeation amount Q demonstrated by the PTFE porous membrane obtained according to the present invention varies greatly, depending on the draw ratio and film thickness of the PTFE film used, on the gas differential pressure $\Delta P$, etc. For instance, when the gas differential pressure $\Delta P$ is 0.05 MPa, the gas permeation amount Q is about 50–300 ml/min/cm$^2$. Similarly, the porosity of PTFE porous membranes obtained according to the present invention varies greatly depending on the draw ratio and film thickness of the PTFE film used, and the porosity obtained is usually about 15–35%.

The pores which are formed in the PTFE membranes obtained in accordance with the present invention have a shape which is nearly round, as evidenced by the electron microscope photographs thereof. Though the pore diameter of these pores varies greatly, depending on the draw ratio of the PTFE film used, the pore diameter of the pores formed in the PTFE porous membrane was usually about 0.1–0.5 μm when the PTFE film was biaxially stretched to 2×2 times. The porosity determined in that case was about $0.1 \times 10^8$ to about $3.0 \times 10^8$/cm$^2$. In this connection, the pores formed in PTFE porous membranes obtained from the PTFE fine powder are only those which are of an elliptical shape with a large difference between the major axis and minor axis.

EFFECTS OF THE INVENTION

Because the processes for the production of PTFE porous membranes in accordance with the present invention are so designed as to use PTFE molding powder having an average particle diameter of 1–900 μm obtained by suspension polymerization of tetrafluoroethylene, and to subject the PTFE film, before streching thereof, to a heat treatment again and to a slow cooling treatment so as to adjust the crystallinity of PTFE in the PTFE film thus treated, the PTFE porous membranes obtained thereby come to possess such effects as mentioned below.

(a) The present PTFE porous membranes have pores which are nearly round in shape and, moreover, the pore diameter of the pores are almost uniform.
(b) The present PTFE porous membranes are excellent in mechanical strength as well as in porosity.
(c) The present PTFE film is excellent in stability when it is stretched, causing no occurrence, or a little, if any, of breakage or pinholing in the resulting film.

Accordingly, it may be said that the PTFE porous membranes according to the present invention are excellent in filtering characteristics.

The present invention is illustrated below with reference to examples, but it should be construed that the invention is in no way limited to those examples.

EXAMPLE 1

PTFE molding powder (Polyflon M 12 produced and sold by Daikin Kogyo K.K.) having an average particle diameter of 25 μm obtained by suspension polymerization of tetrafluoroethylene was premolded in a metal mold at a molding pressure of 15 MPa. The preform obtained was then sintered at 365° C. to prepare a PTFE molding. This PTFE molding was skived into a film to prepare a PTFE film of 0.1 mm in thickness.

The PTFE film obtained was heat treated again in a circulating-air oven at 370° C., and then subjected to a slow cooling treatment in a circulating-air oven at a cooling rate of about 5° C./hr. The PTFE film after the slow cooling treatment had a crystallinity of 65% and a specific gravity of 2.18.

The PTFE film, thus subjected to the slow cooling treatment, was biaxially stretched at a draw ratio of 2.0×2.0 and a temperature of 250° C. to obtain a PTFE porous membrane. This porous membrane had a large number of pores which are nearly round in shape with the largest pore diameter of 0.5 μm, and a porosity of about 34%.

The $N_2$ gas permeation amount Q of the PTFE porous membrane obtained above was measured while varying the gas pressure differential ΔP to obtain the results as shown in Table 1.

EXAMPLE 2

A PTFE porous membrane was obtained by repeating the same procedure as in Example 1, except that the PTFE film was biaxially stretched at a temperature of 315° C.

The PTFE porous membrane obtained had a large number of pores which were round in shape with a pore diameter of less than 0.5 μm. This PTFE porous membrane had a porosity of 22%. The $N_2$ gas permeation amount Q of this membrane was measured in the same manner as in Example 1 to obtain the results as shown in Table 2.

COMPARATIVE EXAMPLE 1

A PTFE porous membrane was produced in the same procedure as in Example 1, except that the PTFE film was not subjected to a heat treatment again and a slow cooling treatment.

On examining the thus obtained PTFE porous membrane by means of an electron microscope photograph thereof, the pores formed were not uniform and the strength of the membrane was low. Furthermore, this PTFE porous membrane was processed, whereupon pinholing occurred in the processed product.

COMPARATIVE EXAMPLE 2

In Example 1, the PTFE file was heated in a furnace at 370° C. for 1 hour, the film was taken out of the circulating-air oven and quenched at a cooling rate of higher than 70° C./hr while allowing to stand in an ambient atmosphere. After quenching, the PTFE film had a crystallinity of 52.5% and a specific gravity of 2.14.

This film was biaxially stretched at a draw ratio of 2.0×2.0 and a temperature of 250° C. to obtain a PTFE porous membrane. This porous membrane had a large number of pores nearly round in shape with the largest pore diameter of 0.5 μm, but the porosity of this membrane was 27%, which is somewhat low.

COMPARATIVE EXAMPLE 3

With the intention of producing the PTFE porous membrane, the same procedure as in Example 1 was repeated except that the PTFE film was stretched at a temperature of 340° C. However, no pores were formed in the stretched PTFE film, and the desired PTFE porous membrane was not obtained.

What is claimed is:

1. A process for the production of polytetrafluoroethylene porous membranes, which comprises preparing a polytetrafluoroethylene preform by compression molding a polytetrafluoroethylene resin molding powder having an average particle diameter of 1–900 μm obtained by suspension polymerization of tetrafluoroethylene, heating the preform at a temperature above 327° C. followed by skiving the heated preform into a film form, heating the obtained film at a temperature above 327° C., slowly cooling the heated film at a cooling rate of less than 70° C./hr so as to adjust the crystallinity of polytetrafluoroethylene in the heated film to 60–75%, and stretching the heated film either uniaxially or biaxially to 1.3 to 6.5 times while heating at a temperature of 100°–320° C.

2. The process according to claim 1 wherein the particle diameter of the polytetrafluoroethylene resin molding powder is 10–50 μm.

3. The process according to claim 1 wherein the cooling rate after heated the polytetrafluoroethylene film is less than 10° C./hr.

4. The process according to claim 1 wherein the crystallinity of polytetrafluoroethylene after cooling is 65–70%.

5. A process according to claim 1 wherein the streching temperature of polytetrafluoroethylene films is 200°–250° C.

6. A process according to claim 1 wherein the draw ratio for stretching polytetrafluoroethylene films is 1.8–2.3 times.

TABLE 1

| Pressure differential [MPa] ΔP | Permeation amount Q [ml/min/cm²] |
|---|---|
| Example 1 | |
| 0.05 | 65 |
| 0.08 | 110 |
| 0.10 | 130 |
| 0.15 | 200 |
| 0.20 | 270 |
| 0.30 | 440 |
| 0.40 | 600 |
| Example 2 | |
| 0.05 | 8 |
| 0.08 | 13.5 |
| 0.10 | 18 |
| 0.15 | 28 |
| 0.20 | 36 |
| 0.30 | 58 |
| 0.40 | 85 |

* * * * *